United States Patent [19]
Thompson

[11] 3,728,427
[45] Apr. 17, 1973

[54] ELECTRICALLY CONDUCTIVE RESINOUS STRUCTURAL MATERIAL AND METHOD FOR ITS PREPARATION

[75] Inventor: Clinton D. Thompson, Providence, Utah

[73] Assignee: Thiokol Chemical Corporation, Bristol, Pa.

[22] Filed: Nov. 17, 1970

[21] Appl. No.: 90,310

[52] U.S. Cl. .............. 264/101, 156/276, 156/285, 161/162, 264/104
[51] Int. Cl. .................... B29c 24/00, B32b 5/16
[58] Field of Search .................. 264/104, 313, 91, 264/DIG. 78, 111, 101, 108, 112, 315; 117/227, 31, 217; 156/276, 285, 62.2, 242, 279, 278, 323; 161/162

[56] References Cited

UNITED STATES PATENTS

| 2,861,911 | 11/1958 | Martin et al. | 264/104 |
| 2,614,955 | 10/1952 | Halsall | 156/285 X |
| 3,326,719 | 6/1967 | Beltzer | 117/227 X |
| 3,194,860 | 7/1965 | Ehrreich | 264/104 |

OTHER PUBLICATIONS

Modern Plastics Encyclopedia (1967), Pages 633–637, 640

Primary Examiner—George F. Lesmes
Assistant Examiner—Lorraine T. Kendell
Attorney—William R. Wright, Jr.

[57] ABSTRACT

A structural material having an electrically conductive surface is presented along with a method for its preparation. The material is particularly useful wherever it is desirable to eliminate the danger of electrostatic sparks or other electrical conduction along the material's surface. The material is resinous in character, can be reinforced, and is prepared by coating a mandrel with a resinous gel, depositing conductive metal slivers, flakes or needles upon it before it cures, applying glass cloth, applying pressure to the cloth, slivers and gel while the gel cures to force the slivers to the surface against mandrel and then removing the material from the mandrel after it has cured.

4 Claims, 3 Drawing Figures

PATENTED APR 17 1973  3,728,427

Clinton D. Thompson
INVENTOR.

BY *William R. Wright Jr.*
AGENT

ELECTRICALLY CONDUCTIVE RESINOUS STRUCTURAL MATERIAL AND METHOD FOR ITS PREPARATION

The present invention relates to structural material of a generally resinous nature but which has a surface which will conduct electricity.

In the manufacture of solid propellants for rocket motors, or in the manufacture of explosives or flammable liquids, it becomes very important that any possibility of the occurrence of a spark be prevented if dangerous explosions or fires are to be avoided. One of the principal sources of sparks is static electricity accumulated in the apparatus. For instance, in the mixing of solid propellants, it has been the practice to carry off any static charges which might otherwise be built up by placing thin plastic sheets on the various surfaces of the machine, holding them in place with pressure-sensitive tape and then grounding them in several locations. This arrangement, however, has the disadvantage that the sheets are flimsy and easily torn or ripped thus impairing their ability to carry off the static charge. In addition, they have to be replaced every time the facilities are used in order to be certain of effective grounding thus consuming considerable costly time and effort. The present invention, on the other hand, provides a material which can be built right in and is a long-lived, practically permanent part of the facility without the need for replacement except after very long service.

It is, therefore, an object of the present invention to provide a plastic resinous structural material having an electrically conductive surface in which slivers or flakes of electrically conductive material are partially embedded in the plastic resin in contact with one another and also, at the same time, in partial contact with the surface to be exposed to static electricity.

It is also an object of the present invention to provide a plastic resinous structural material which has an electrically conductive surface but which can be formed into various shapes and can be made into various desired thicknesses.

It is also an object of the present invention to provide a method for the preparation of a structural material of the foregoing type and properties.

It is an object of the present invention to provide a structural material which has an electrically conductive surface and which is strong in tension and compression, long-wearing and resistant to shock damage from dropped tools and the like.

Other objects and advantages will be apparent from the detailed description which follows.

The electrically conductive surfaced material which comprises a preferred embodiment of the present invention and a preferred method of making it are hereinafter described.

A mandrel or mould 10, usually constructed of metal and having a smooth exterior is prepared by coating it first with a suitable parting or releasing compound and then applying a thorough coat of plastic resin 11 in a gelled state making sure that there are no bare spots. The resin or gel 11 can be any of one of a number of types but should preferably be of a slow curing sticky type having a consistency about like that of a paste at the time of its application and at ordinary room temperatures. It must have the qualities of allowing the electrically conductive particles to adhere to it as well as for it to stay in place on the mandrel 10 without running or slumping. Also it must be smooth in consistency without lumps or voids. The well known catalyst-cured expoxy resin normally used in making glass fiber laminates has been found to be suitable for this purpose.

Figures 1, 2:
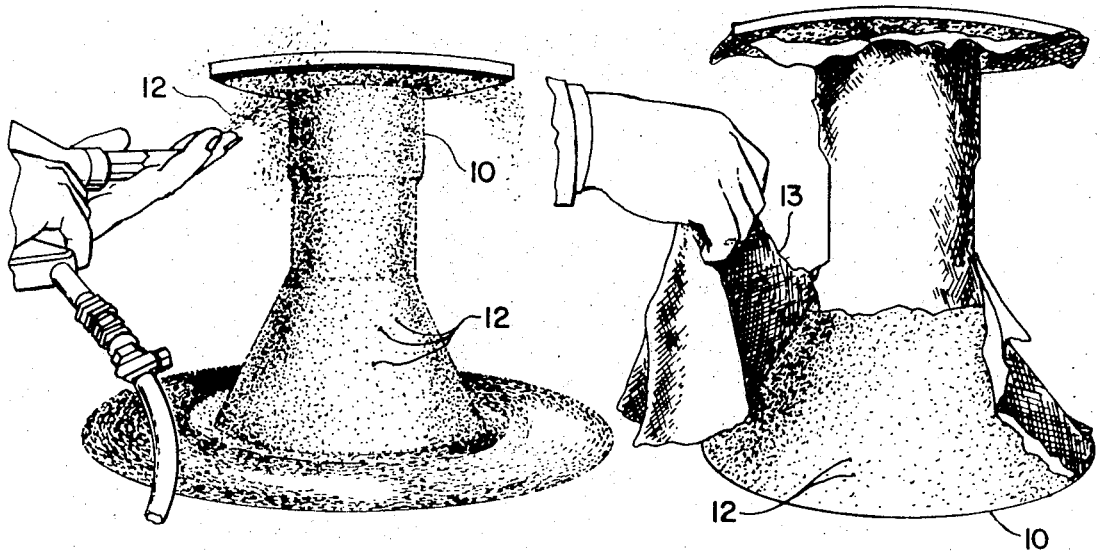
FIG. 1 is a view showing a resin coated mandrel or form on which electrically conductive particles are being sprayed.
FIG. 2 is a similar view showing how layers of resin-impregnated glass fiber cloth are applied over the electrically-conductive particles.
Figure 3:
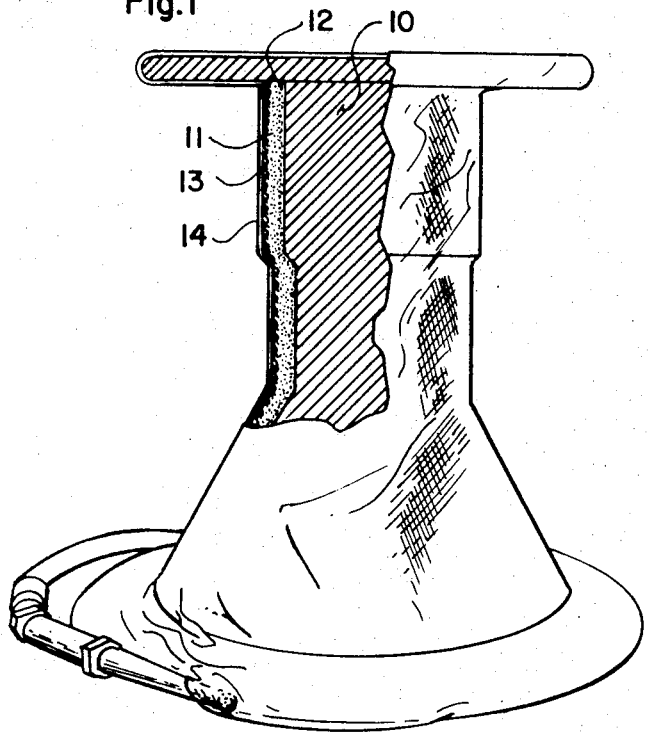
FIG. 3 is a similar view in partial cross section showing a vacuum bag applied to the exterior of the mandrel and its applied material.

After the gel 11 is in place and before it has cured, electrically conductive particles 12 are deposited upon the gel by entraining them in an air stream directed upon the gel 12 in the manner shown in FIG. 1. This deposition is continued until the entire gelled surface is covered to a depth where additional particles 12 will no longer adhere after which the exterior is over-laid with a layer of resin-impregnated glass cloth 13 as shown in FIG. 2. At this point, the entire mould is enveloped in a released plastic bag 14 as indicated in FIG. 3 and a near vacuum is drawn within it causing the bag 14 to be drawn against the electrically conductive particles 12, forcing them into the gel and into contact with one another and also against the surface of the mould 10 so that most of the particles 12 will be both partially exposed at the mandrel surface and partially embedded in the resin 11 as well as in contact with their adjacent particles and so to provide, for all practical purposes, a fully conductive electrically conductive surface. A roller is also run over the exterior of the bag to help ensure the complete elimination of bubbles brought about by wrinkles in the bag and from trapped air. The gel is then allowed to stand under vacuum until it is thoroughly cured after which it is removed from the vacuum bag and separated from the mould. Additional layers of resin-impregnated glass cloth are then added to the back side of the material to further strengthen it and to build it up to any desired thickness, these layers being applied individually in the usual manner of laying the cloth in a coat of resin and allowing the resin to cure with the cloth in place.

The particles 12 may be of any electrically conductive metal including copper or iron but it is desirable that high conductivity metal of high corrosion resistance be utilized such as aluminum or silver. The particles should be in the form of flakes, needles or slivers and in their preferred embodiment are aluminum slivers about one-eighth of an inch in length and about 0.005 inch in diameter. The size of the particles 12 is not absolutely critical but small, fine particles are desirable because they can be air blown easily, adhere readily to the resin 12 and provide thorough surface coverage.

After the material has been completely laid up to the desired thickness and fully cured, it can be easily cut and worked into various sizes and shapes to fit any desired installation by ordinary tools such as saws, files, drills or the like. The finished material can be used for a great variety of purposes such as tool handles, table tops, bench tops, counter tops, wall panelling in paint spray booths and other locations, ceilings, floors and many other places where an electrically conductive surface is desirable.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only by the scope of the following claims.

What is claimed is:

1. The method of making plastic material having an electrically conductive surface consisting of the steps of applying plastic resin in a gelled state on a released mold form, depositing as many electrically conductive particles thereupon as will adhere to the resin, adding at least one resin impregnated glass cloth reinforcing strip to the side of the material on which the particles have been deposited, compressing the resin, electrically conductive particles and reinforcing strip by enveloping them and the mold in an air tight bag and exhausting air therefrom to draw at least a partial vacuum to thus allow atmospheric pressure on the exterior of the bag to force many of the particles to the surface of the mold and allowing curing to take place under the vacuum condition, and thereafter removing the mold and the bag.

2. The invention set forth in claim 1 with the electrically conductive material comprising particles in the form of needles.

3. The invention set forth in claim 2 with the particles in the form of slivers.

4. The invention set forth in claim 2 with the particles in the form of flakes.

* * * * *